(12) United States Patent
Duimovich et al.

(10) Patent No.: US 7,277,938 B2
(45) Date of Patent: Oct. 2, 2007

(54) METHOD AND SYSTEM FOR MANAGING PERFORMANCE OF DATA TRANSFERS FOR A DATA ACCESS SYSTEM

(75) Inventors: Frank Duimovich, Ottawa (CA); Benoit Godin, Ottawa (CA); Frederico Colásante, Ottawa (CA); Mohamed Hashim, Ottawa (CA)

(73) Assignee: Microsoft Corporation, Redmond, WA (US)

( * ) Notice: Subject to any disclaimer, the term of this patent is extended or adjusted under 35 U.S.C. 154(b) by 629 days.

(21) Appl. No.: 09/825,164

(22) Filed: Apr. 3, 2001

(65) Prior Publication Data

US 2002/0052947 A1    May 2, 2002

(30) Foreign Application Priority Data

Apr. 4, 2000    (CA)    ................................. 2,303,739

(51) Int. Cl.
*G06F 15/173*    (2006.01)
(52) U.S. Cl. ..................... 709/224; 709/203; 707/104.1
(58) Field of Classification Search ................ 709/202, 709/203, 248, 224; 707/203, 10, 5, 104.1; 705/10, 14
See application file for complete search history.

(56) References Cited

U.S. PATENT DOCUMENTS

| | | | | |
|---|---|---|---|---|
| 5,752,042 | A * | 5/1998 | Cole et al. .................. | 717/173 |
| 5,835,911 | A * | 11/1998 | Nakagawa et al. ......... | 707/203 |
| 5,913,041 | A | 6/1999 | Ramanathan et al. .. | 395/200.63 |
| 5,953,534 | A | 9/1999 | Romer et al. ............... | 395/712 |
| 6,021,437 | A * | 2/2000 | Chen et al. ................. | 709/224 |
| 6,070,190 | A * | 5/2000 | Reps et al. ................. | 709/224 |
| 6,282,570 | B1 * | 8/2001 | Leung et al. ............... | 709/224 |
| 6,356,898 | B2 * | 3/2002 | Cohen et al. ................ | 707/5 |
| 6,360,261 | B1 * | 3/2002 | Boyd et al. ................. | 709/224 |
| 6,438,592 | B1 * | 8/2002 | Killian ....................... | 709/224 |
| 6,505,201 | B1 * | 1/2003 | Haitsuka et al. ............. | 707/10 |
| 6,701,362 | B1 * | 3/2004 | Subramonian et al. ...... | 709/224 |
| 6,701,363 | B1 * | 3/2004 | Chiu et al. .................. | 709/224 |
| 6,704,732 | B1 * | 3/2004 | Barclay ....................... | 707/10 |
| 6,839,680 | B1 * | 1/2005 | Liu et al. ..................... | 705/10 |

(Continued)

OTHER PUBLICATIONS

Search results for application, techdictionary.com, visited Aug. 26, 2004.*

(Continued)

*Primary Examiner*—Jungwon Chang

(57) ABSTRACT

A method and system of managing performance of data transfers for a data access system providing data transfers from content servers to remote users in response to user requests, includes calculating performance data summaries at least at a subset of the user sites and transmitting the data for receipt for remote summarization and storage. The data include information indicative of transfer size, throughput, transfer time, source, time and date. The method and system include selecting a quantity of the performance data received, preferably over a time interval, and summarizing and storing the data. Further summarizes can also be calculated. The data may be used to ascertain conditions and manage the performance of the data access system. In the preferred embodiment, the method and system measure performance of Internet HTTP server applications. The method and system can monitor the performance of a plurality of data access systems, selecting performance data depending on the source of the data transfer for separate summarization and storage thus enabling a high volume of data transfer monitoring.

49 Claims, 10 Drawing Sheets

U.S. PATENT DOCUMENTS

2002/0099600 A1 * 7/2002 Merriman et al. ............ 705/14

OTHER PUBLICATIONS

*NetScore Intelligent Agen Tracks Users Response Time to Intranet/Internet Servers, File Servers, IP Hosts and SNA Mainfraims*, Anacapa Software, May 28, 1996.

NetStat, *The Fundamentals of the System*, copyright 1998.

*New eBusiness Assurance Solutions Enable Organizations to Maximize Performance and Improve Effectiveness of Their E-commerce Sites*, Candle Corporation, New York, Apr. 29, 1999.

*Lateral Line Network for Internet Infrastructure Management*, www.appliant.com, copyright 2000.

* cited by examiner

Packet Size: 1200
pid: 340
threadId: 368
timeStamp: 952372115
state: 2
clientCookie.versionMajor: 1
clientCookie.clientCookie.versionMinor: 2
clientCookie.source: webHancer
clientCookie.clientId: 3439438016167880896952357565
clientPostCode:
clientIpAddr: 167880896
dnsLookupTime: 0
connectionDelay: 10
clientMaxAccessSpeed: 818000
userAgent: Mozilla/4.0(compatible;MSIE 5.0;Windows NT;DigExt)
usingProxy: 1
host: www.yahoo.com
hostIpAddr: 3439438016
httpMethod: 0
target:/
referer:
httpResponse: 200
numFramesetPages: 0
numPageGets: 4
numGetRequestsSent: 4
numGetResponsesReceived: 4
numOkResponses: 4
numOkCachedResponses: 3
numMovedPermanentlyResponses: 0
numNotModifiedResponses: 0
numNotFoundResponses: 0
numSuccessResponses: 4
numClientErrorResponses: 0
numServerErrorResponses: 0
numBytesSent: 1160
numBytesReceived: 20070
numApplicationBytes: 0
numImageBytes: 7413
numTextHtmlBytes: 11768
numTextPlainBytes: 0
numTextXmlBytes: 0
numTextOtherBytes: 0

FIG. 5A numAudioBytes: 0
numVideoBytes: 0
numCachedBytes: 7413
pageLoadTime: 932
totalTransferTime: 1352
totalNetworkRTT: 10
totalConnectTime: 10
totalDNSLookupTime: 0
applicationTransferTime: 0
audioTransferTime: 0
imageTransferTime: 420
textHtmlTransferTime: 932
textPlainTransferTime: 0
textXmlTransferTime: 0
textOtherTransferTime: 0
videoTransferTime: 0
contentThroughput: 14844.7
applicationThroughput: 0
audioThroughput: 0
imageThroughput: 17650
textHtmlThroughput: 12626.6
textPlainThroughput: 0
textXmlThroughput: 0
textOtherThroughput: 0
videoThroughput: 0

FIG. 5B

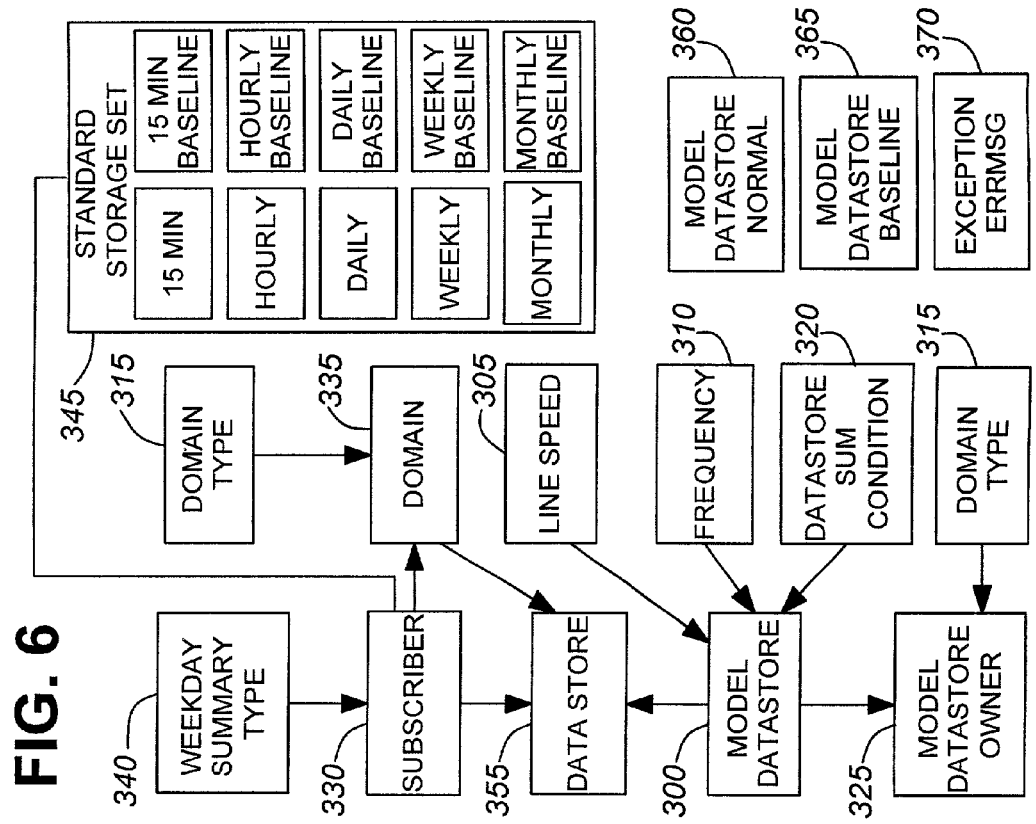

METHOD AND SYSTEM FOR MANAGING PERFORMANCE OF DATA TRANSFERS FOR A DATA ACCESS SYSTEM

TECHNICAL FIELD

This invention relates generally to managing a data access system, more particularly, to monitoring and managing performance of data transfers over a communications network between a server system and a remote user site.

BACKGROUND TO THE INVENTION

E-business, E-commerce and other network service providers are concerned how their users perceive their services. Such service providers operating server systems with content servers providing particularly Hyper Text Transfer Protocol based applications over a network to distributed remote users desire to measure and manage their quality of service experience.

Among the quality indicators of interest to providers is data transfer throughput, providing a rate of transfer of data between a server and a remote user site. Other factors include success or failure of a transfer and whether a transfer was terminated by a user.

A variety of approaches to measuring performance of data transfers such as throughput within such data access systems is known. U.S. Pat. No. 5,913,041 issued Jun. 15, 1999 to Hewlett-Packard Company discloses a passive server side approach. Disclosed is a method and system for monitoring throughput of a data access system whereby each transfer of data from a content server to a user is logged at the content server and accessed to enable evaluation of the performance of the data transfers. However, each content server required to be monitored must be configured to implement the invention. Such a system cannot collect data from other access systems such as may be connected to the Internet at large to provide baseline data with which to form comparisons with the data for a specific data access system monitored.

Other systems provide a more active approach, emulating typical user access to measure throughput, etc. to content servers. One such tool is described in NetScore Intelligent Agent Tracks Users Response Time to Intranet/Internet Server, File Servers, IP Hosts and SNA Mainframes, dated 28 May, 1996, Anacapa Software. Such systems transmit performance data to a remote server for collection and analysis. However, simulated traffic approaches do not provide reliable real-world performance measures as real customers do not generate the traffic.

What is needed is a method and system for measuring real-world user-generated data transfers and user access of content servers, such as a World Wide Web server, that is transparent to user with minimal local resource use.

SUMMARY OF THE INVENTION

In accordance with an aspect of the invention, there is provided a method of managing a data access system for transferring data between a server system and a plurality of user sites upon request from said user sites where at least a subset of the user sites comprise performance monitoring agents capable of calculating and transmitting performance data indicative of the data transfer performance of data access systems. The method comprises receiving the performance data transmitted from the performance monitor agents, selecting a quantity of data received, summarizing the quantity of data received; and storing the summarized quantity of data into a database.

The quantity of data selected may represent performance of the data access system for a specific time interval, preferably, for example, 15 minutes. The method may receive data indicative of the performance of a plurality of data access systems from the performance monitoring agents and filtering the data received to pertain to a selected data access system. Performance data may be correlated to factors of interest.

The stored summarized data may be further used to calculate additional summaries and additionally used as a basis for ascertaining quality of service conditions of a data access system.

In accordance with a further aspect of the invention, there is provided a performance management system for monitoring and managing a data access system for transferring data between a server system and a plurality of user sites upon request from said user sites where at least a subset of said user sites comprise performance monitoring agents capable of calculating and transmitting performance data indicative of the performance of data access systems. The performance management system is capable of receiving data indicative of the performance of the data access system transmitted from the performance monitor agents, selecting a quantity of data received, summarizing the quantity of data received storing the summarized quantity of data into a database; and utilizing the stored summarized data as a basis for ascertaining quality of service conditions of the data access system.

An advantage of the invention is that by calculating and storing only summaries of the performance data from a selected quantity of the data received, the size of the resulting data is not dependent of the quantity of data received. That is, data from individual users is summarized and aggregated to avoid prohibitive raw data storage. Another advantage of the invention is that monitoring of many data access systems of interest can run continuously as performance data received can be selected and routed for separate summarizing by distributed applications and databases.

BRIEF DESCRIPTION OF THE DRAWINGS

The foregoing and other features and advantages will be better understood from the following detailed description of certain preferred embodiments of the invention with reference to the drawings, in which:

FIGS. 5A and 5B illustrate a sample page summary message (not including protocol headers) according to the invention;

FIG. 6 is a schematic chart showing a subscriber database according to the invention;

DETAILED DESCRIPTION OF A PREFERRED EMBODIMENT

Overview

Figure 1:
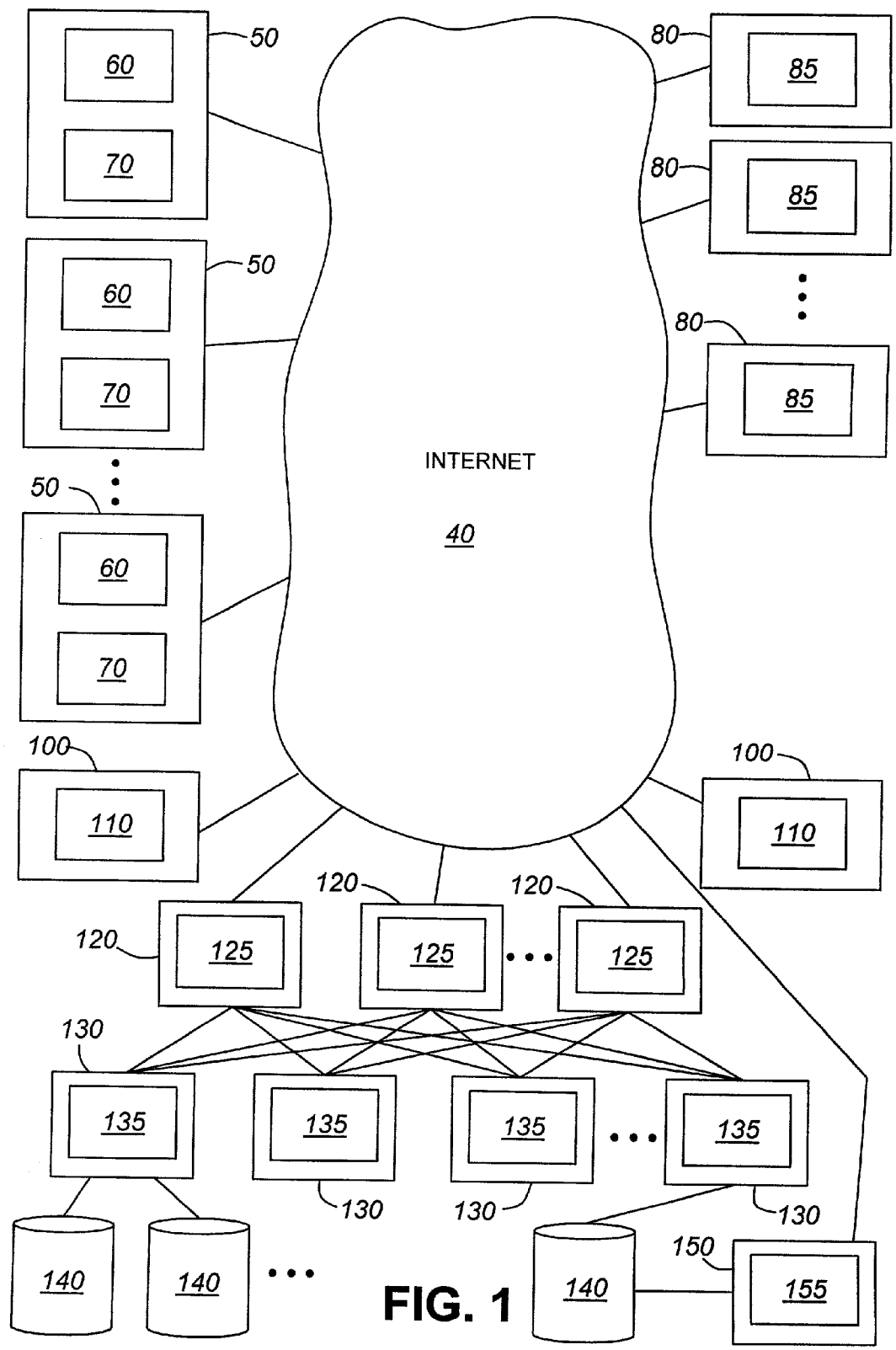
FIG. 1 is a schematic diagram showing the general architecture of a system that operates in accordance with the present invention.

In the preferred embodiment, the Performance Management System for monitoring and managing a server-client data access system (such as an e-business or e-commerce service offered to clients over the Internet) comprises 6 major components: Client; Authority; Director; Summarize; Database and Database Summerizer; and Reporting Engine.

The Client, including an Agent, is installed on User Sites, typically PCs, workstations and other devices capable of network communication. The Client is responsible for collecting performance data for Internet application related activities. The Agent performs a preliminary summary of this data before it sends it to a Director for further processing.

The Authority provides control information required by the Agents, for example, identifying which Director to send the data to, which version of the Agent is the latest and where an upgrade can be downloaded, etc. The Agent synchronizes at startup with the Authority and at regular intervals (also controlled by the Authority Server) to ensure that it is running with the latest information available.

Preferably, for collecting time dependant performance monitoring data, at startup, the Authority also indicates to the Agent a time offset indicating the number of seconds the clock at the User Site differs from a baseline time maintained by the Authority, which User Site time, adjusted by the offset, is reported by the Agent with the collected performance data to provide universal time stamped collection. The baseline time in the preferred embodiment is Greenwich Mean Time (GMT), which is not critical. Preferably, all communications between Agents and the Authority are done over HTTP to ensure the ability to communicate over the Internet.

The Director can be viewed as a software router. Its main responsibility is to accept performance data packets collected by the Agents and forward the packets to the appropriate Summerizer for further analysis. Once again, the communications between the Agents and the Director Servers are preferably done over HTTP to ensure the ability to communicate over the Internet. The communications between the Summerizes and the Directors is preferably accomplished via a simpler transmission protocol. UDP protocol is somewhat less reliable but much more scalable than TCP/IP.

The Summerizer is composed of at least one pair of Summerizer Data Loader processes. Performance data gathered by the Agents is forwarded to an appropriate Summerizer by the Director Server(s). The Director Server may route the information based on a variety of parameters, particularly by host IP address, domain name or target URL to which the performance data pertains so that a subscriber to the Performance Management System may have data pertaining to a site, page or other structure of interest summarized separately for its benefit.

The information received, if suitable,(i.e. particularly if it relates to a URL of interest to the particular Summerizer and if it is timely received) is subsequently analyzed and summarized at regular periodic intervals. In the preferred embodiment, such an interval is every 15 minutes. The Summerizer process produces a file each interval containing the results of the summaries for that interval. The information contained in the file is thereafter loaded into a database by the Data Loader process.

The Database and Database Summerizer store the loaded temporary 15 minute data in various datastores in the database and calculate further summaries to create aggregate datastores by hour, day, week, month or other period). The summarized information is available for generating reports or for use in other active monitoring processes.

The Reporting Engine permits extraction of the collected data for reviewing in real-time or historically.

General Architecture

Referring now to the drawings and more particularly to FIG. 1, there is shown, in a schematic diagram form, the basic components of a Performance Management System 20 that operates in accordance with the present invention. Users sites 50 are connected via a network such as the Internet 40 to Remote Sites 80 having content servers 85 supporting a variety of Internet applications including World Wide Web access, e-mail, bulletin boards, news groups and FTP access. Such servers may offer e-commerce, e-business or other on-line services via to clients via Internet applications. Together, the User Sites, network and Remote Sites comprise a data access system.

A User Site 50 can connect to the Internet 40 in a variety of manners well known in the art and which is not critical, for example through an Internet Service Provider network (not shown) or a local area network having a gateway connection to the Internet (not shown). Similarly, it is understood that Remote Sites 80 may connect to the Internet 40 via a private network or other indirect means (not shown).

Each User Site 50 has at least one client Internet application 60 for communicating with Sites 80 such as a Web Browser, as is well known, for browsing Sites 80 on the Internet 40 via World Wide Web access. Each User Site 50 further includes a Client Application 70 for the purpose of collecting performance data and transmitting the data via the Internet 40 to one of the Director Server Sites 120. Each Director Server Site 120 includes a server application 125 for receiving transmitted performance data and for directing the data to one or more Summerizer Servers 130 having server applications 135 for aggregating the data in data warehouses 140.

In the preferred embodiment, Client Application 70 further includes the capability of bi-directional communication with Authority Server Sites 100 which sites each include a server application 110 for authenticating Client Application 70 communications, identifying to the Client Application which Director Server Site to communicate with, and for optionally updating the Client Application 70.

It is understood that Director Server Sites 120 and Authority Server Site 100 may connect to the Internet 40 via a private network or other indirect means (not shown). While communications between the Director Server Sites 120 and Summerizer Servers 130 is illustrated over a private network, such communications may be over a public network such as the Internet. Although two Authority Server Sites 100 are shown in FIG. 1, it is recognized that one or many sites could be provided on the Internet 40. While the general architecture shows the Authority Server Sites 100, Director Server Sites 120 and Summerizer Sites 130 as separate sites to achieve better scalability and performance reliability, the respective server application each type of site provides may be provided on fewer sites or on sites having combined functionality. That is, a Director Server may perform as a combined Authority and Director.

Aggregated data stored in the data warehouses 140 may be reviewed particularly by e-commerce, e-business or other on-line service providers subscribing to the Performance Management Service via a Reporting Server 150 connected to the Internet 40 and having a Reporting Engine application 155 in communication with the data warehouses 140. In addition, and optionally, one or more server applications operating in real-time may review the collected data and alert subscribers to problems indicated by the performance data (not shown).

Figure 2:
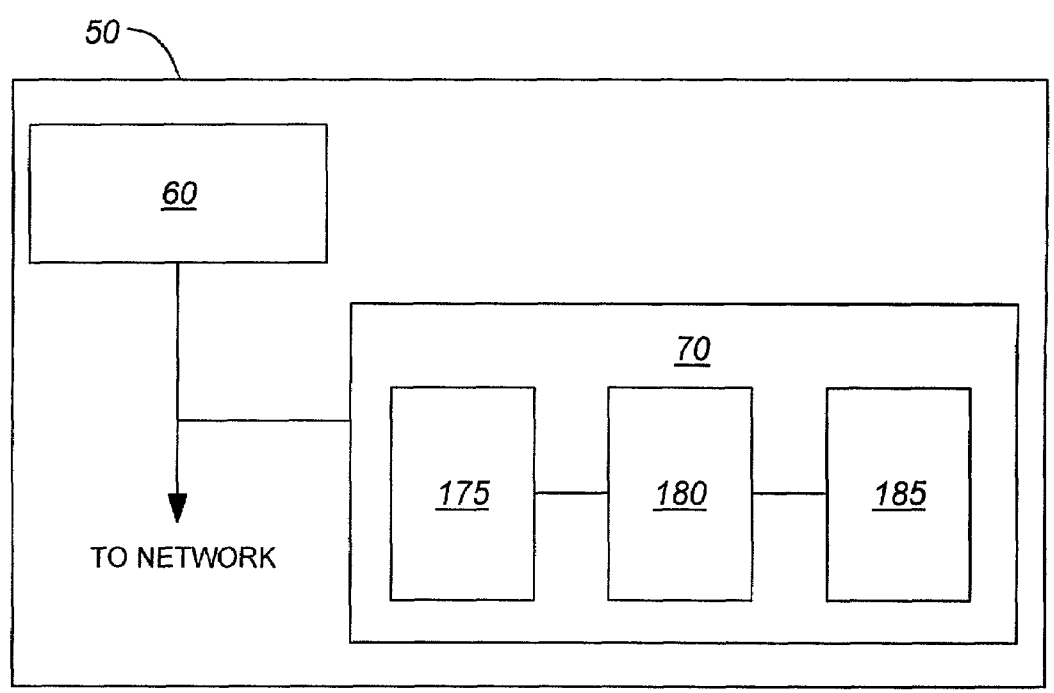
FIG. 2 is a schematic diagram showing the User Site according to the invention.

With reference to FIG. 2, a typical User Site 50 comprises a central processor (CPU), RAM, ROM, clock, operating system (OS), network interface, input/output devices and data storage device (all not shown).

Internet Application 60 is supported by the OS at an application layer. The Internet Application 60 relies on Transmission Control Protocol (TCP) of a transport layer to provide reliable transport for its Internet communications. TCP uses acknowledgment and retransmission schemes to recover from packet losses that may occur during transmission. Internet Protocol (IP) is the network layer protocol for typical broadband data systems. IP in turn operates over a media access layer that is specific to the physical network technology used.

Client Application 70 is a collection of files that reside on the User Site 50 for the purpose of collecting, in the preferred embodiment, web browser-based HTTP performance data and transmitting that data to the Director Server 120. The browser-based performance data transmitted is in the form of a "page summary" for a complete page (if successfully retrieved and for less than a complete page otherwise) by a user's Internet Application (web browser) 60. The Client Application 70 comprises three main components, a Network Interface Monitor (NIM) 175, a Shared memory module (Shmem) 180 and an Agent 185.

Client Application 70 monitors network-based communications of Internet Application 60, particularly for web browsing. The NIM 175 captures Internet Application 60 communications to the User Site's network interface. The NIM 175 creates a message for each communication containing raw performance data. The NIM 175 then writes the message in a shared memory segment (not shown) through the Shmem 180 API so that it may be read by the Agent 185 via the Shmem 180 API.

The messages passed through the Shmem 180 are for individual web page object retrievals, (i.e., every image, plug-in object, page frame, applet, cascading style sheet, etc.). The Agent 185 builds a page summary from the individual messages, computing the metrics for the overall page load operation based on the metrics received for the individual objects of the page.

The raw data supplied by the NIM in the preferred embodiment is illustrated in Table 1.

TABLE 1

| Raw Data Field | Description |
| --- | --- |
| Pid | the process id of the client application that retrieved the HTTP data |
| ThreadID | the thread id within the process that retrieved the HTTP data |
| SocketNumber | the id of the TCP socket used to retrieve the HTTP data |

TABLE 1-continued

| Raw Data Field | Description |
| --- | --- |
| DnsLookup Time | the time required to translate the host name to an IP address prior to establishing TCP connection to retrieve the HTTP data |
| NewConnection | a boolean indicator that the HTTP data was retrieved via a new socket conection to the server; the browser may choose to reuse an existing connection to the server in order to retrieve a new page object |
| IpAddress | the IP address of the server from which the HTTP data was retrieved |
| Port | the port number on the server where a TCP connection was established in order to retrieve the HTTP data |
| SocketState | this is valid only when the message is complete (see Complete); it indicates the state of the socket once all of the HTTP data has been retrieved from the socket; it is used to determine if the request was completed successfully, or provide an explanation if the data retrieval was incomplete |
| ConnectionDelay | an approximation of the time required to establish a connection to the server from which the HTTP data was retrieved |
| TimeStampSendStart | the time at which the HTTP data was requested by the application |
| TotalSendSize | the size of the HTTP data sent to the server in order to initiate the reception of HTTP data |
| FirstResponseDelay | the time required for the server to respond to the request for HTTP data after a connection was successfully established |
| TotalResponseDelay | the total time required to completely receive the HTTP data |
| ExpectedBodyLength | the number of bytes of HTTP data expected from the server in response to the request |
| TotalRecvSize | the total number of bytes of HTTP data received from the server, including HTTP and TCP overhead |
| Throughput | the data transmission throughput observed while receiving the HTTP data |
| MaxSpeed | the maximum access speed observed on the workstation since the NIM was last initialized (usually since the last reboot of the workstation) |
| Complete | a boolean indicator that the current raw data structure is complete; for every HTTP request, two raw data structures will be received by the agent, one at the time the request is made, an one when the HTTP data reception has been completed; some of the data in the structure will only be valid when this flag is 'true' |
| SendHeaderLength | the number of bytes in the HTTP send header, that is, the request for the HTTP data from the server; this is also the number of bytes in the buffer pointed to by SendHeader below |
| RecvHeaderLength | the number bytes in the HTTP receive header, that is, the header returned with the data by the server; this is also the number of bytes in the buffer pointed to by RecvHeader below |
| RecvBodyLength | the number of bytes of data that follows the HTTP header received from the server |
| RecvHtmlBodyLength | the number of bytes of in the buffer pointed to by RecvBody below; this value will be non-zero only if HTTP receive header indicates that the data is of Content-Type: text/html |
| SendHeader | a copy of the HTTP send header as send to the server to request data |
| RecvHeader | a copy of the HTTP receive header as sent by the server ahead of the HTTP body |
| RecvBody | if the HTTP receive header indicates that the body data is of Content-Type: text/html, this is a copy of the HTTP body |

Page summary data according to the preferred embodiment is illustrated in Table 2. Particularly important to performance monitoring are monitored (eg. hostIpAddr, target etc.), an indication of the status (success or failure) of the communication (eg. numOKResponses, numOKCachedResponses, . . . , numServerErrorResponses) as well as throughput indicators (eg. contentThroughput, applicationThroughput, . . . , videoThroughput).

Data throughput is the rate at which a Remote Site 80 transfers data to and from the client Internet Application 60 at the User Site 50. As in the preferred embodiment, measurement is preferably above the transport layer to consider more useful data, ignoring individual measures of corrupt packets for example. Throughput is a ratio of the bytes transferred to the total time taken for the data transfer.

TABLE 2

| Page Summary Field | Description |
| --- | --- |
| pid | the process id of the application that requested the page |
| threadid | the thread id within the process that request the page |
| timestamp | the time (GMT) at which the page was requested, aligned with the Director Server clock. |
| state | the final state for the page after receiving all available object data, e.g. completed, stopped, connection failed, etc. |
| clientCookie | contains information about the end-user workstation that produced the page summary, namely, its internally visible IP address, its externally visible IP address, the version number of the agent running on the workstation, and the source of the agent, i.e., a string that uniquely identifies the organization that distributed the agent running on the workstation |
| clientIpAddr | the internally visible IP address of the workstation |
| clientPostCode | the text-based postal code of the geographical location in which the workstation is located |
| dnsLookupTime | the time (in milliseconds) required to translate the destination hostname to an IP address for the page request; this is the time required for just the page |
| connectionDelay | the approximate time to establish all connections required to download all object that comprise the page |
| clientMaxAccessSpeed | the maximum access speed observed on the workstation since the NIM was last initialized (usually since the last reboot of the workstation) |
| userAgent | the type of browser that requested the page (the UserAgent field of the HTTP header) |
| usingProxy | a boolean indicating whether or not the page was requested through a proxy server |
| host | the hostname of the server that delivered the page |
| hostIpAddr | the IP address of the server that delivered the page |
| httpMethod | the HTTP method with which the request was made, e.g. GET, POST, etc. |
| target | the target URL; (a HTML page) |
| referrer | the HTTP referrer of the page, that is, the URL visited prior to visiting this page |
| httpResponse | the HTTP response code for the page request |
| numFramesetPages | the number of framed pages detected on the page |
| numPageGets | the total number of objects in which a request was initiated, but not necessarily sent |
| numGetRequestsSent | the total number of objects actually requested for the page using the HTTP GET method |
| numGetResponsesReceived | the total number of objects completely or partially received for the page |
| numOkResponses | the total number of objects received for the page with a HTTP status code of 200 |
| numOkCachedResponses | the total number of objects received for the page with a HTTP status code of 200 that were retrieved from a proxy cache; this count will be less than or equal to numOkResponses |

TABLE 2-continued

| Page Summary Field | Description |
| --- | --- |
| numMovedPermanentlyResponses | the total number of objects received for the page with a HTTP status code of 301 (permanently) or 302 (temporarily) |
| numNotModifiedResponses | the total number of objects received for the page with a HTTP status code of 304 |
| numNotFoundResponses | the total number of objects received for the page with a HTTP status code of 404 |
| numSuccessResponses | the total number of objects received for the page with a HTTP status code of 2XX |
| numClientErrorResponses | the total number of objects received for the page with a HTTP status code of 4XX |
| numServerErrorResponses | the total number of objects received for the page with a HTTP status code of 5XX |
| numBytesSent | the total number of bytes sent to the server to request all objects of the page, including HTTP overhead |
| numBytesReceived | the total number of bytes received from the server, including HTTP overhead |
| numApplicationBytes | the total number of page object bytes attributed to plugins on the page (type application/*) |
| numImageBytes | the total number of page object bytes attributed to images on the page (type image/*) |
| numTextHtmlBytes | the total number of page object bytes attributed to HTML text on the page (type text/html) |
| numTextPlainBytes | the total number of page object bytes attributed to plain text on the page (type text/plain) |
| numTextXmlBytes | the total number of page object bytes attributed to XML on the page (type text/xml) |
| numTextOtherBytes | the total number of page object bytes attributed to all other forms of text on the page (type text/*) |
| numAudioBytes | the total number of page object bytes attributed to audio on the page (type audio/*) |
| numVideoBytes | the total number of page object bytes attributed to video on the page (type video/*) |
| numCachedBytes | the total number of bytes for all page objects that were retrieved from a proxy cache rather that directly from the specified host |
| pageLoadTime | the total time (in milliseconds) required to download all page data from the server; this is an elapsed time |
| totalTransferTime | the total time (in milliseconds) spent transfering of all page data from the server; this is not an elapsed time |
| totalNetworkRTT | an approximation of the total delay in pageLoadTime attributed to the network |
| totalConnectTime | the sum total of the time required to set up all connections needed to retrieve the entire contents of the page |
| totalDNSLookupTime | the sum total of the time required to do DNS lookups for all objects that comprise the page |
| applicationTransferTime | the total time spent transferring page data of type application/* |
| audioTransferTime | the total time spent transferring page data of type audio/* |
| imageTransferTime | the total time spent transferring page data of type image/* |
| textHtmlTransferTime | the total time spent transferring page data of type text/html |
| textPlainTransferTime | the total time spent transferring page data of type text/plain |
| textXmlTransferTime | the total time spent transferring page data of type text/xml |
| textOtherTransferTime | the total time spent transferring page data of type text/*, excluding HTML, XML and plain text |
| videoTransferTime | the total time spent transferring page data of type video/* |
| contentThroughput | the throughput observed in loading the entire page contents |
| applicationThroughput | the throughput observed in loading page data of type application/* |

TABLE 2-continued

| Page Summary Field | Description |
| --- | --- |
| audioThroughput | the throughput observed in loading page data of type audio/* |
| imageThroughput | the throughput observed in loading page data of type image/* |
| textHtmlThroughput | the throughput observed in loading page data of type text/html |
| textPlainThroughput | the throughput observed in loading page data of type text/plain |
| textXmlThroughput | the throughput observed in loading page data of type text/xml |
| textOtherThroughput | the throughput observed in loading page data of type text/*, excluding HTML, XML and plain text |
| videoThroughput | the throughput observed in loading page data of type video/* |

It is understood that many of the data elements in the page summary table are not all required elements for performance monitoring. It may be desirable to evolve the page summary data structure to include other data and to remove less valuable data. For example, the referer data element may be of apparently little value from a reporting perspective. Consideration may be given to reporting additional information concerning the type of HTTP scheme for a particular page to differentiate between HTTP, HTTPS, etc transfers.

Various tasks of the Agent 185 are subject to varying delays, for example because of network communication congestion. As is commonly understood, various functions of the Agent 185 may be divided into threads to operate independently as set out in FIG. 3. In the preferred embodiment, as a result of the timing requirements, the agent process is divided into the following threads:

1) Main:
   contains the main process loop which performs the authority server communication and the automatic update procedure
2) OS Message:
   exists only to respond immediately to OS messages that result in process shutdown, as well as a notification that the OS system clock has been changed;
3) Data Collection:
   reads the raw data from the NIM 175 buffering it in a data structure shared with the data summarization thread;
4) Data Summarization:
   reads the raw data collected by the data collection thread and attempts separate page summaries from the incoming data, as well as attributing page components (e.g. images) to the correct parent page;
   attempts to perform a rollup of all frames of a page; a frame set produces one page summary per frame, for combination to produce a summary for the overall page;
   writes completed page summaries to a data structure shared with the data transmission thread;
5) Data Transmission:
   reads completed page summaries produced by the data summarization thread, packages preferably according to communication protocol, for example a binary protocol embedded within HTTP, understood by the Director Server Application 125 and Agent 185, and transmits the packaged messages to the Director Server 120; and
6) Plug-In(s) (optional):
   the Agent Plug-In Framework is described below
   each plug-in runs in a separate thread.

Figure 3:
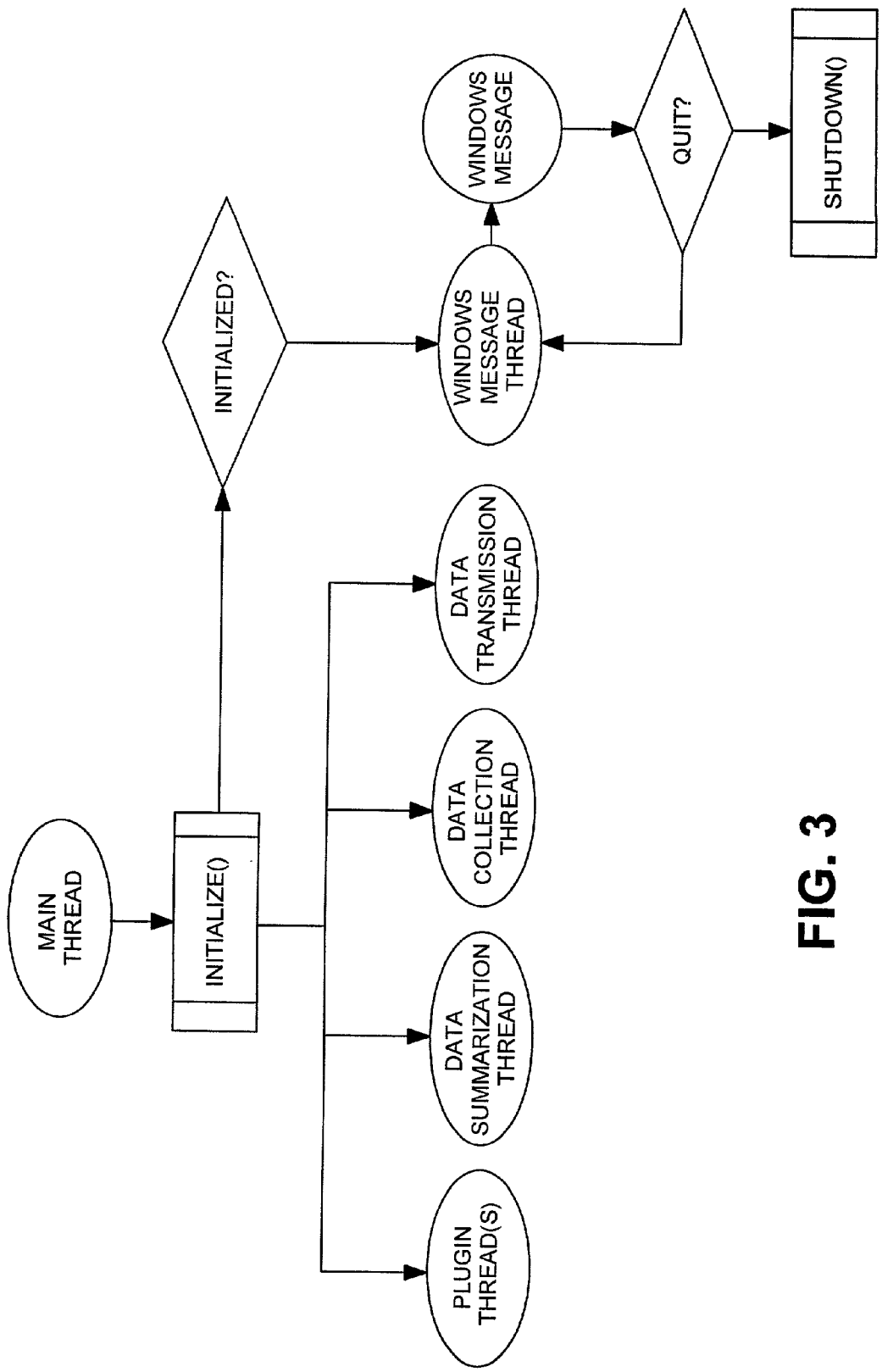
FIG. 3 is a schematic diagram showing the threads of the Agent according to the invention.
Figure 4:
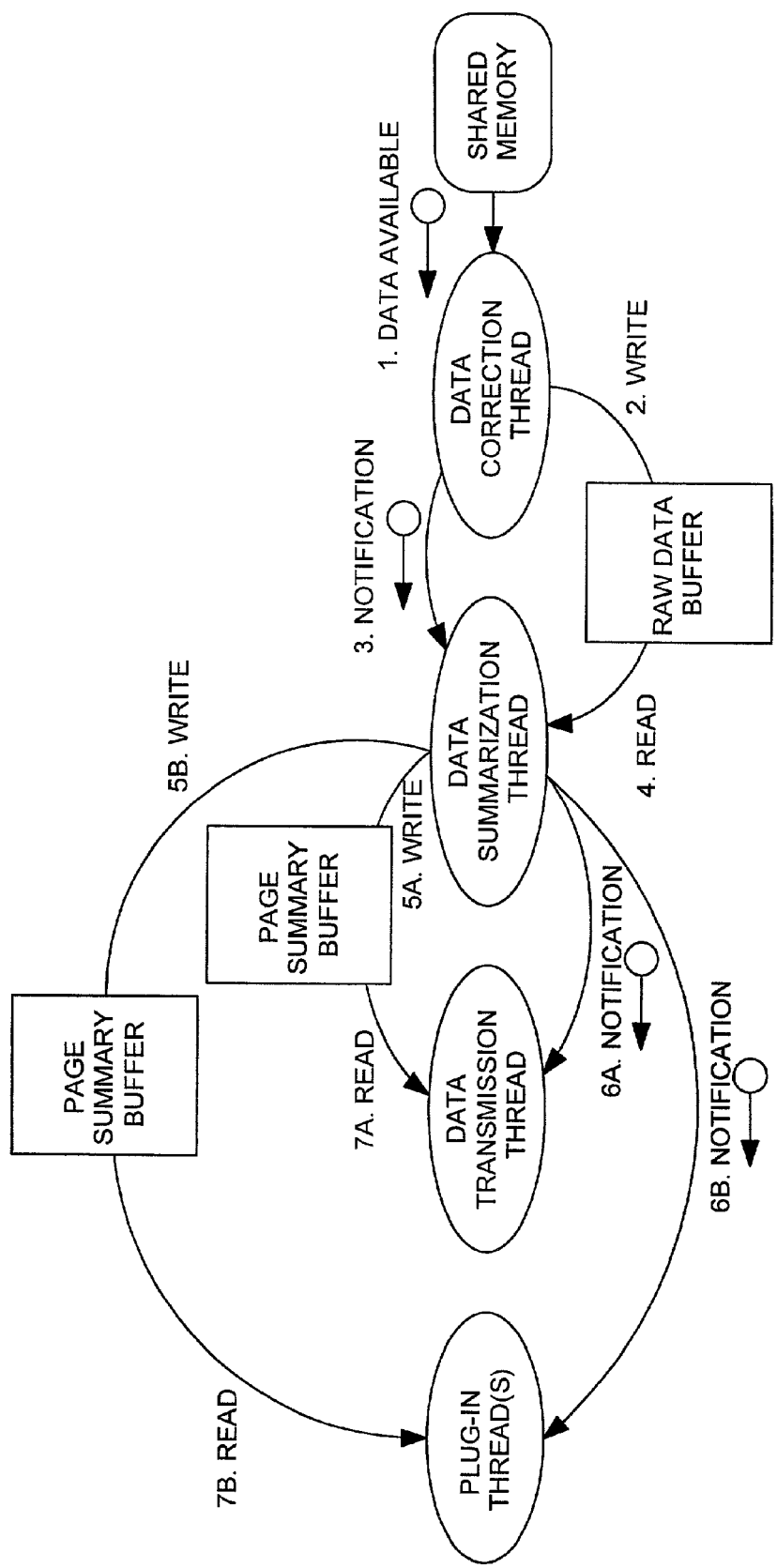
FIG. 4 is a schematic diagram showing raw data and page summary data flow through the Agent threads according to the invention.

With reference to FIG. 3, upon start-up of the Agent 185, the main thread attempts to initialize the Agent object, setting up data buffers and event objects required for exchanging data between, and synchronizing the various threads that will provide the Agent's functionality. The main thread also communicates with the Authority Server 100 as discussed below. Upon successful initiation, the main thread spawns the worker threads and the OS Message thread. FIG. 4 illustrates raw data and page summary data flow through the Agent threads. FIGS. 5A and 5B illustrate a sample page summary message (not including protocol headers).

In the preferred embodiment, messages comprising page summary data for an individual page are sent by Agent 185 to the Director Server 120. In the event that communication with the Director Server 120 is impaired, the Agent 185 employs an exponential backoff and iterates through the list of available Director Servers (from Agent 185 configuration information) until either the page summary expires (becomes too old), or it is successfully transmitted.

Preferably, the list of available Director Servers 120 is reconfigured within the Agent 185 each time the Agent 185 communicates with the Authority Server 100.

In the preferred embodiment, the Agent 185 communicates with the Authority Server every time the Agent is started and periodically while running, upon the expiry of the Agent's lease. The Agent 185 may obtain a lease expiry time each time it contacts the Authority Server 100. In a preferred embodiment, there exists both a primary and secondary Authority Server 100. In the event that communication with the Authority Server 100 is impaired, the Agent 185 employs an exponential backoff. Communication is first attempted with the primary server; if this fails, the Agent 185 waits a predetermined amount of time then attempts to communicate with the secondary server. If communication with the secondary server also fails, the Agent 185 waits the same amount of time. The process is repeated 3 more times, with an exponential increase in the amount of wait time with each pass.

In the preferred embodiment, communication between the Agent 185 and Authority Server 100 permits the refreshing of the Agent's configuration information and automatic updating of the Client Application 70, in whole or in part, when a newer version is available.

The refreshing of Agent 185 configuration information is done by way of bi-directional communication with the Authority Server 100. Using a communication protocol, for example a binary protocol embedded within HTTP, understood by the Agent 185 and Authority Server 100, the Agent 185 notifies the Authority Server 100 of the User Site 50 internally visible IP address, the version of the Client Application 70 currently running on the User Site 50 and the current local time on the User Site 50.

In return, the Agent 185 receives the following information:
   the agent's externally visible IP address;
   the number of seconds of discrepancy between the Performance Management System's clock and the clock on the User Site 50;
   the addresses of the primary and secondary Authority Servers 110 with which the next Agent-Authority Server communication is to take place;
   a list of Director Servers 120 that are expecting data from this instance of the Agent 185;
   a lease duration, indicating the number of seconds that must elapse prior to the next communication between this instance of the Agent 185 and the Authority Server 100;

the version number of the most current Client Application;

the host name and port number of the server that hosts the binaries to allow the Client Application 70 to automatically update to the current version, if necessary.

As is well understood in the art, the automatic updating of the running agent may occur through the establishment of an HTTP connection to the server identified through communication with the Authority Server to download a self-extracting binary image that may be executed on the User Site 50, preferably in a manner that is transparent to any user of the User Site 50.

There is value in utilizing page summary data beyond simply transmitting it to the Director Server. Agent Plug-in threads may be used for example to analyze page summary data to determine if a particular host is performing below specified thresholds (e.g. throughput). Possibilities on the end-user workstation include using cookies or other means to provide information such as maximum access speed, maximum throughput, average throughput, etc. on a per-host or per-domain basis. Additionally, and preferably in a more controlled environment, a User Site 50 may be operated as a remote monitoring service to provide:

advanced logging output (e.g. web server log format)
triggering trace route analysis
triggering server ping analysis
triggering alarms (e.g. via email); or
launching a 'bot'

Although not shown, a typical Authority Server 100 comprises a server computer comprising a central processor (CPU), RAM, ROM, clock, operating system (OS), network interface, input/output devices and data storage device.

As discussed, Authority Server Application 110 for each Authority Server 100 provides flow control like services to each Client Application 70 Agent 185. In the preferred embodiment, Authority Server Application 110 is composed of two basic components, a User Interface (UI) component and a connection processing component. The UI component primarily provides statistical and configuration information about the Authority Server 100 and Server Application 110 (i.e. displays and may permit modification of the initiation parameters, current time and time started). The connection processing is handled by a thread. This thread accepts TCP/IP connections and creates a thread (for each connection) to handle the reading from and writing to the network communication socket. The protocol used to communicate with the authority server is preferably a binary protocol embedded within HTTP. As is understood in the art for communications between differing processor types and OS types, the contents of the network messages are streamed out in network byte ordering using DX or TaggedDX classes. This dx'ing and subsequent un-dx'ing ensures that the protocol will be correctly handled across differing processor and OS architectures (eg. SPARC™ vs PENTIUM™, Solaris™ vs Win32™).

A typical Director Server 120 comprises a server computer comprising a central processor (CPU), RAM, ROM, clock, operating system (OS), network interface, input/output devices and data storage device (all not shown).

Director Server Application 125 routes incoming page summary data to Summerizer Servers 130. The Director Server Application 125 operates in a similar fashion to the Authority Server Application 110. There is a UI component and a connection component. The Director Server Application 125 UI component may display connection statistics, diagnostic information and a running chart of connection load. The connection component is a thread for accepting incoming connection requests (TCP/IP) from Client Applications 70. The main connection component thread spawns individual connection handling threads to handle each connection. The created thread reads the incoming data, forwards the data to one or more Summerizer Servers 130 having Server Applications 135 and closes the connection with the Client Application 70. The page summary data may be routed to various Summerizer Servers depending on the content of the data, particularly the data indicating the source being monitored (hostIpAddr, target, etc.)

In the preferred embodiment, the Director Server Application 125 directs the page summary data to a Summerizer Application 135 at a Summerizer Server 130 for all Internet locations monitored and, if the incoming data is associated with an Internet location of interest to a subscriber to the Performance Management System, to a Summerizer Application 135 at a Summerizer Server 130 configured for the particular subscriber. The Director Server Application 125 need not decode all the page summary data; it may merely forward the data to one or more selected Summerizer Servers 130 to carry out the actual decoding. The linkage between the incoming URL's may be configured through a table look up process for example. A few example table entries may appear as:

Company X, companyx.com, hostname1, 8902
Company X, www.companyx.net, hostname1, 8902
A Company, trademark-of-ACompany.com, hostname5, 8802
Org 123, www.org123.org, hostname2, 8902

The first field specifies the subscriber name (e.g. Company X). The second field specifies an Internet location associated with the subscriber that the subscriber is interested in monitoring. In the first above two entries, the subscriber is interested in two domains. The next two fields specify the host and port number for the Summerizer Server for the subscriber. The Director Server Application 125 forwards, preferably using UDP, any data associated with the entry's domain field to the host and port destination address.

A typical Summerizer Server 120 comprises a server computer comprising a central processor (CPU), RAM, ROM, clock, operating system (OS), network interface, input/output devices and data storage device (all not shown).

As noted, Summerizer Server Application 135 preferably operates in one of two modes, either summarizing subscriber specific data or summarizing general Internet collected data. The main difference between these two modes of operations resides in the way the Summerizer determines whether a performance data packet (also called, page summary) is to be kept for summarization. When running in "Subscriber Specific") mode, for each performance data packet received, it must be decided whether to keep or discard that packet. That decision is taken by attempting to match the domain part of the URL data included in the packets with one of the domain URLs found in a domain summary list for the subscriber accessible by the Server Application. If a match is found, the data is kept; otherwise the data is discarded. When running in "Internet" mode, this decision doesn't have to be taken, since the summaries represent activities for the whole Internet. Additionally, in both modes, the timestamp of the page summary will be reviewed to determine whether the data is too old (i.e. is not within the current time interval to be summarized) or not.

The Summerizer Server Application 135 provides data summarization while permitting status and configuration and other inquiries through a interface (API) component. In the preferred embodiment, the Summerizer Server Application correlates page summary rates with one or more factors of interest, providing 5 different summaries: Subscriber; Speed Range; and Domain Type (e.g. Domain; Tree View; and Page) as described further below.

As each page summary contains a timestamp, each summary correlates performance with time of day. It is understood that other factors of interest may include performance data as observed by Agents in a particular geographic area or connecting via a specific Service Provider etc. Such factors of interest enable a review of the collected data to determine whether resources of a Subscriber are taxed on particular times of the day or days of the week as well as whether specific portions of the resources are providing adequate service. Correlating the data with factors of interest assists in ascertaining transfer performance conditions.

In the preferred embodiment, every 15 minutes the Summerizer Server Application 135 produces a file containing the results for each summary type or level it is configured to perform. The primary summary level, Subscriber, is a summarization of all the data collected for a particular subscriber over the given time interval.

The Speed Range Summary level provides summarization based on page summary data selected according to User Site access speed (eg, 14.4 K, 28.8K, 112K). For example, a subscriber may wish to monitor performance data measured at User Sites connecting to its Remote Site(s) at access speeds at or below 28.8K. The Summerizer Server Application then summarizes page summary data for access speeds between a MinAccessSpeed=Lower limit of the speed range (e.g. 0 bps) and a MaxAccessSpeed=Upper limit of the speed range (e.g. 28800 bps) for all data received during the interval and pertaining to the subscriber.

In the preferred embodiment, there are three Domain Level summaries. Domain Summary provides summarization for all page summary data related to a specifically identified domain (eg. www.companyX.ca). Page Summary provides summarization for all data related to a specific URL or web page while Tree View Summary provides summarization for all data related to a specific root URL and for those further URLs for which the specific URL is the root thereof. (Eg. for URL=www.companyX.ca/support/, Tree View Summary summarizes all pages at the level /support/ as well as /support/productA/, /support/productB/, /support/download/ etc. as the case may be.)

FIG. 6 illustrates schematically an instance of a Subscriber Database 140 in the preferred embodiment. Each specific subscriber database is generated from a generic database model together with configurable subscriber chosen parameters. Each specific database is generated from a model comprising a Model DataStore 300 together with definitions for factors of interest such as Line Speed 305, Frequency 310, Domain Type 315 (eg. Domain, Page, Tree View) as well as calculation definitions (Data Store SumCondition 320) and owner parameters (Model DataStore Owner). A specific subscriber database draws on the Model DataStore 300 as well as common Storage Set definitions (Standard Storage Set 345 and Speed Storage Set 350) and generates a database (Data Store 355) from Subscriber 330 particulars and according to selected configuarble information such as particular domains and other URLs of interest (Domain 335 according to Domain Type 315) and selected summary preferences, such as Weekday Summary Type 340, permitting variable collection of data according to preferred descriptions of a summarization period (for e.g. defining a week as excluding Saturday and Sunday).

Data templates (Model DataStore Normal 360 and Model DataStore Baseline 365) provide definitions for normal and baseline data entries for the storage sets. In the preferred embodiment, data is stored in "pairs" showing current or normal data for the period together with baseline data providing a running summary from the present interval back a predefined period, for example 28 days.

Data entries are stored according to common Storage Sets definitions. Two basic storage set types are defined in the preferred embodiment: a Standard Storage Set 345 and a Speed Storage Set 350. In a Standard Storage Set data is stored for each 15 minute interval and a running 15 minute baseline. At the end of each hour, the 15 minute data is rolled up into hourly data and at the end of each day, hourly data is rolled up into daily data. At the end of each week and month respectively, daily data is rolled up into weekly and monthly data. Instances of the storage sets can be maintained at the subscriber level (i.e. summarizing data for all page summaries of interest to a subscriber as well as at a narrower domain level (according to Domain Type, e.g. Domain, Page or Tree View).

Similarly, subscriber level data is also maintain correlated to the Line Speed factor of interest in a Speed Storage Set. 15 Minute, Hourly, Daily, Weekly and Monthly data and corresponding baseline data are further summarized according to line speed ranges (eg. 28K or less, >28-56K, >58K-128K, <384K, and >384K). It is understood that other factors of interest may be correlated to the collected data and separate storage sets maintained at the subscriber or domain levels.

In particular, data may additionally be maintained in accordance with a time zone preference of a subscriber. It is understood that the Internet operates 24/7 and that a Remote Site 80 may be operating in a geographic location having a different time of day than a User Site 50 accessing the Remote Site 80. As page summary data is collected and forwarded in real time according to the invention, the Summerizer Server Application aggregates data received from widely dispersed Agents for each 15 minute interval according to the timestamp identified in the page summary data. Data received after the expiry of the collection period for an interval is discarded.

To ensure that only data from the same interval is aggregated, as discussed hereinabove, the timestamp at each Agent is synchronized to the Authority Server clock, relative to GMT. Hourly, Daily, Weekly and Monthly summarization in the preferred embodiment is calculated according to the end of an hour, day week or month based on GMT. However, a subscriber operating in a jurisdiction distant from the GMT timezone may wish to see its data aggregated according to the subscribers local time or another time, such as where it considers the majority of its users reside. Thus, one or more datastores may be maintained taking into account an offset from GMT to create a selected timezone database.

In the preferred embodiment the Summerizer Server Application prepares 15 minute data from page summary data it receives for the subscriber for each DataStore of interest (e.g. at the subscriber level, in standard and speed storage sets, and at any selected domain level, in a standard storage set). To produce the file, the Summerizer Server Application 135 aggregates the page summary data, calculating averages for throughput data elements, and totaling other data elements such as the number of page summaries received for the period.

Once the collection period for a particular 15 minute interval terminates, the calculated summarized data is provided to a data loading component for promotion into the database 140.

Additional functionality may be incorporated into the Summerizer Server Application. For example, threshold monitoring may be implemented to review summarized data at the Summary Server stage before loading into the database. Such monitoring for example could determine whether average page load times for a monitored tree or domain is greater than a defined standard, triggering a reporting action such as an alarm message to a contact at the subscriber.

Figure 7:
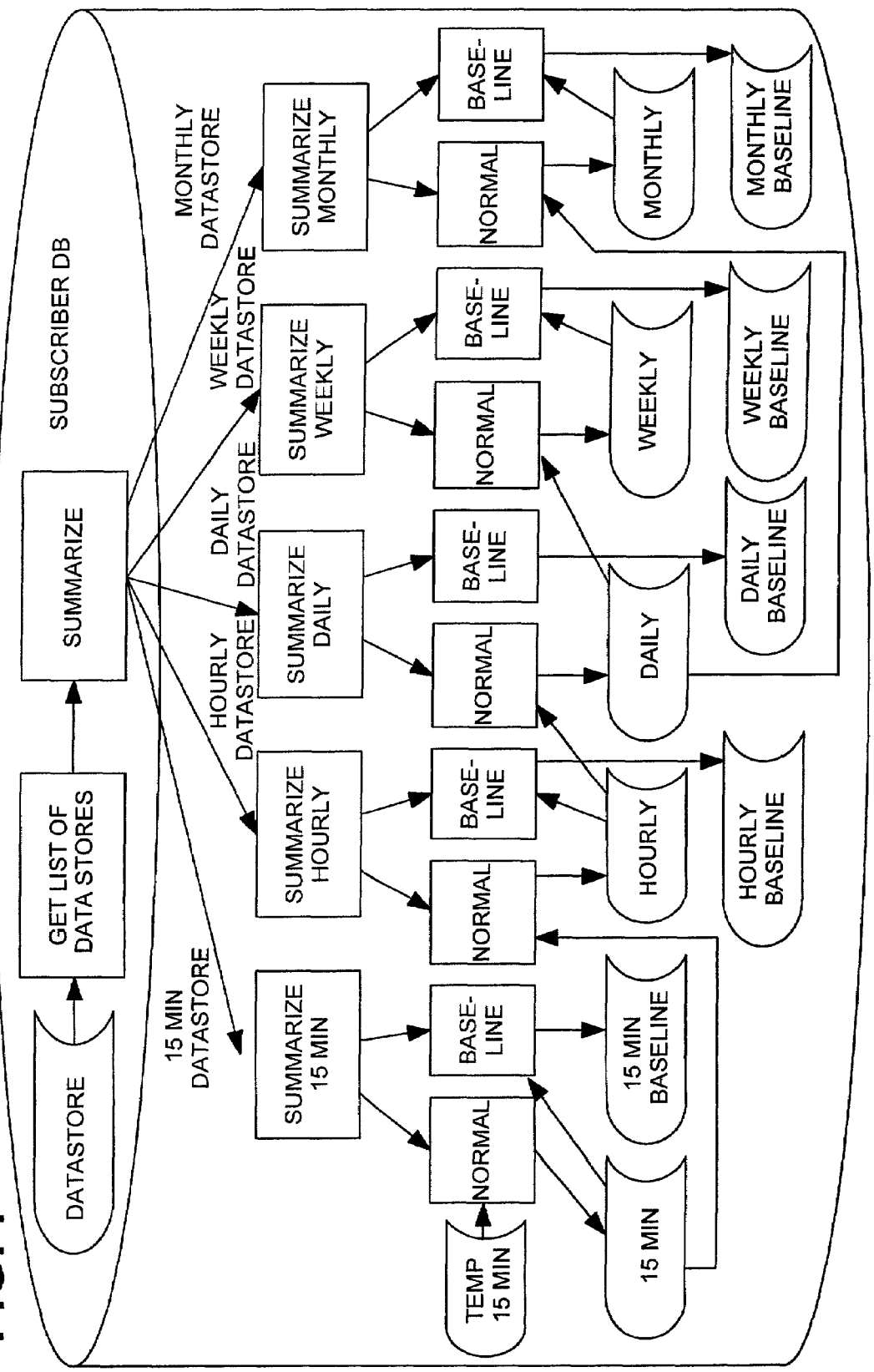
FIG. 7 is a schematic chart showing a database summarization process according to the invention.

The Database Summerizer process is illustrated in FIG. 7. Temporary 15 minute data is loaded in the 15 minute normal store and the baseline calculation is triggered within the database 140. As noted, the baseline data represent a summary of data back a predefined period such as 28 days. The resulting 15 minute baseline data is also stored. At the end of an hour, once the last 15 minute summary of normal data is complete, the hourly summarization is triggered to build hourly data from the four 15 minute interval data entries. Similarly, hourly baseline data is calculated and stored from calculated hourly data. In a similar manner, daily data is calculated from hourly data and stored, and weekly and monthly data are calculated from daily data and stored.

While page summary data forwarded to the Summerizer Server may contain data which may be useful to identify particular end user's or to construct profiles of their habits, in the preferred embodiment, user privacy is maintained and such data is not retained.

Figure 8:
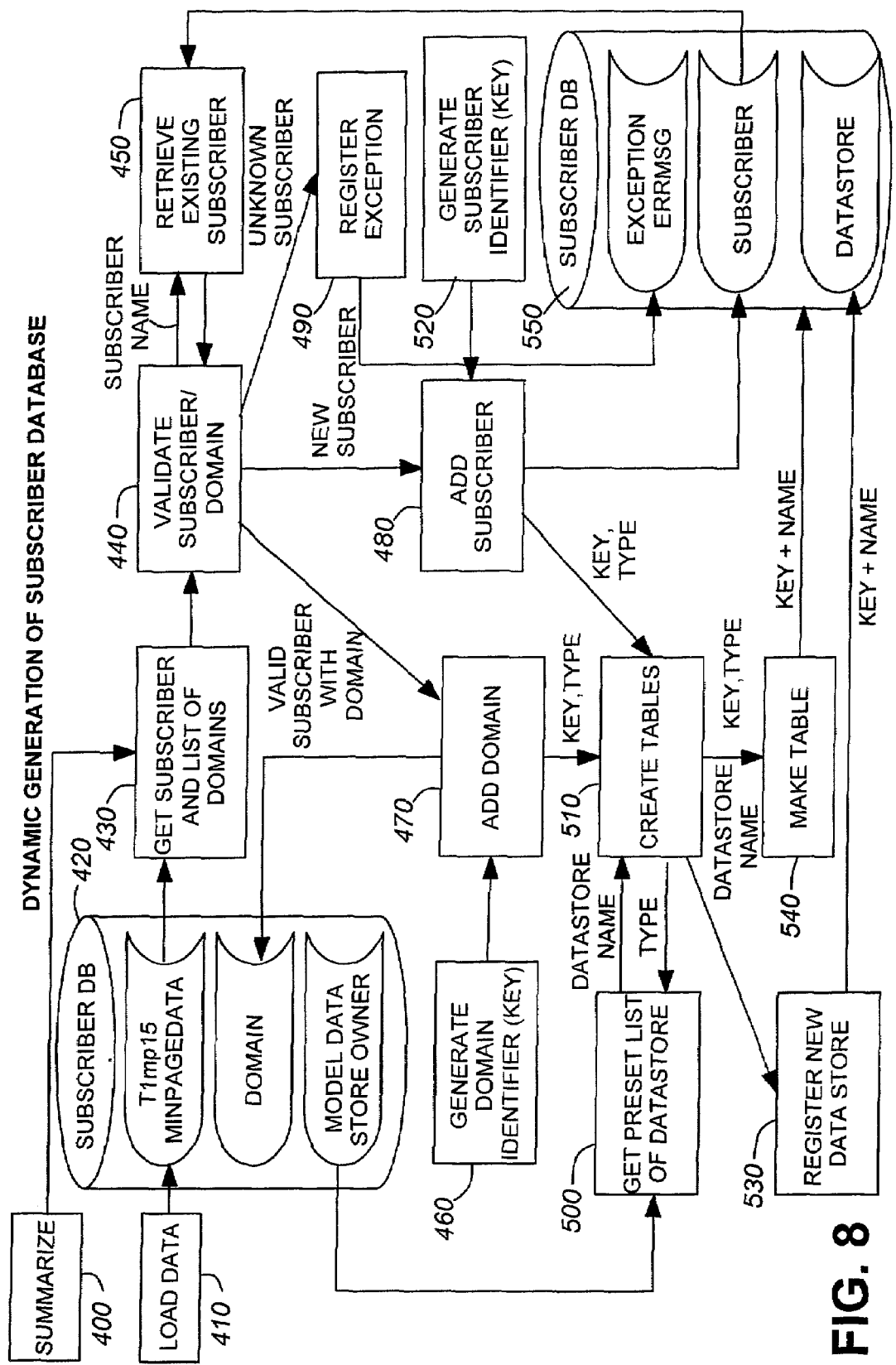
FIG. 8 is a schematic chart showing a dynamic generation of a subscriber database according to the invention.

Databases may be auto-generated via an auto-generate process as set out schematically in FIG. 8. Particulars for a new subscriber are added via a configuration file for the Summerizer to initiate 15 minute data collection (not shown) and a new virtually empty subscriber database 420 is initiated. Once the temporary 15 minute page data (shown within Subscriber database 420) is promoted to the Database by the Loader in the usually way, the actual Subscriber Database DataStore (shown within Subscriber Database 550) is established. As shown by block 440, the temporary 15 Minute Page Data is reviewed to determine the Subscriber. If the Subscriber Database DataStore has already been established for a different subscriber, an exception is registered as shown by block 490. If the Subscriber Database DataStore has not been established, the new Subscriber is added as shown by block 480. Subscriber level data tables are created (as shown by block 510 and 500) from model datastores (shown within subscriber database 420) as discussed hereinbefore. The datatables are assigned unique names pertaining to the specific subscriber according to a generated subscriber key (block 520). The datastore (within Database 550) is generated and registered as shown by blocks 540 and 530.

For each new domain (eg. of type domain, page, tree view as discussed previously) identified in the 15 minute data associated with the subscriber, a similar datastore 550 generation is undertaken for the specific domain (blocks 460, 470, 500, 510, 530, 540). Over time, as new domains are added to subscriber, the database can auto-generate new datastores as the data is collected.

Figure 9:
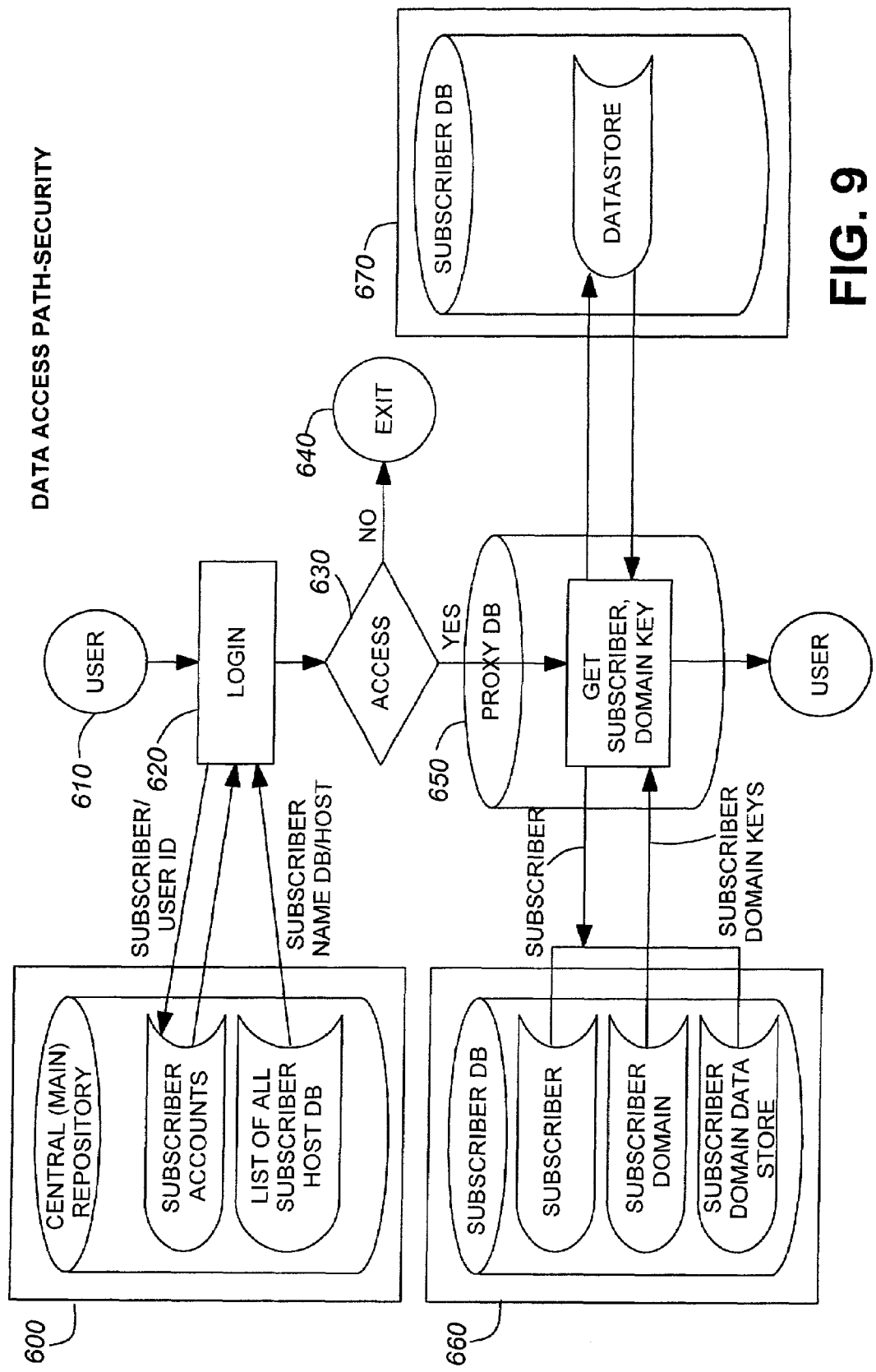
FIG. 9 is a schematic chart showing a data access path to a subscriber database according to the invention.

Databases may be accessed by subscribers and other authorized users according to a preferred embodiment of the invention illustrated schematically in FIG. 9. A User 610 attempts to login (shown as block 620)to access subscriber data 670. The user is validated from a central repository 600 of accounts. If the user is invalid and permitted access (decision box 630) the attempt is rejected (640). If access is permitted, the user is permitted access to the subscriber host databases 660 and 670 via a proxy 650. The proxy acts as a shield providing no direct access to information or knowledge of the physical location of particular subscriber data.

The Summerizer Server Application and Database are thus configured to store subscriber information in separate physical locations, eliminating risks of information contamination with another subscriber's data. From a retrieval perspective, such an arrangement also provides additional security.

By collecting and summarizing performance data at regular intervals the databases can store several years of subscriber information on conventional storage media at manageable costs and with reliable performance. It is apparent that the size of a database after a give time may be calculated in advance from the number of intervals in the time period and the size of each storage set maintained. Given that the database stores summarized data only, the database size is not dependent of the number of individual page summaries received for a subscriber.

Those skilled in the art will recognize that the method and apparatus of the present invention has many applications and that the present invention is not limited to the representative examples disclosed herein. Moreover, the scope of the present invention covers conventionally known variations and modifications to the system components described herein, as would be understood by those skilled in the art.

What is claimed is:

1. A method of managing a data access system configured to transfer data over a communication network between a server system and a plurality of user sites in response to requests from network browsers at the user sites the method comprising:

monitoring a network browser of a first user site of the plurality of user sites to obtain performance data of the data access system, the performance data including performance metrics of a data transfer operation in the data access system performed in response to a network browser request initiated by a user of the first user site, the monitoring being controlled by a monitoring agent resident at the first user site;

creating preliminary summary data of the monitored performance data;

transmitting data indicative of the preliminary summary data from the monitoring agent;

receiving the data indicative of the preliminary summary data transmitted from the monitoring agent;

collecting a quantity of the data received;

summarizing the quantity of the data collected to produce summarized performance data, wherein the summarizing comprises correlating the collected data with one or more factors of interest to produce one or more different types of summarized performance data; and storing the summarized performance data into a database.

2. The method of claim 1 wherein the quantity of the data collected represents performance of the data access system for a specific time interval.

3. The method of claim 2 wherein the time interval is 15 minutes.

4. The method of claim 3 wherein the performance data includes a timestamp identifying a time when the performance data was observed and wherein the collecting comprises collecting the performance data that was observed during the same time interval.

5. The method of claim 1 further comprising, before receiving the performance data:
   receiving data indicative of the performance of a plurality of data access systems from a plurality of performance monitoring agents disposed at the plurality of user sites; and
   filtering the data received to pertain to a selected data access system.

6. The method of claim 1 wherein the one or more different types of summarized performance data are based on at least one of subscriber preferences, user site access speed and domain type of the collected data.

7. The method of claim 1 wherein the server system comprises at least one HyperText Transfer Protocol (HTTP) server.

8. The method of claim 7 wherein the performance data comprises a summary of performance metrics for a HTTP page.

9. The method of claim 1 further including using the stored summarized performance data as a basis for ascertaining quality of service conditions of the data access system.

10. The method of claim 1 further including calculating further summarized data using the stored summarized performance data.

11. The method of claim 1 wherein the data transfer operation includes a stop data transfer request initiated by the user of the first user site.

12. A performance management system for managing a data access system configured to transfer data over a communication network between a server system and a plurality of user sites in response to requests from the user sites, the performance management system comprising:
   means for monitoring a network browser of a first user site of the plurality of user sites to obtain performance data of the data access system, the performance data including performance metrics of a data transfer operation in the data access system performed in response to a network browser request initiated by a user of the first user site, the monitoring means including a monitoring agent resident at the first user site configured to transmit data indicative of the performance data;
   means for creating preliminary summary data of the monitored performance data;
   means for receiving data indicative of the preliminary summary data transmitted from the monitoring agent;
   means for collecting a quantity of the data received;
   means for summarizing the quantity of the data collected to produce summarized performance data, wherein the summarizing comprises correlating the collected data with one or more factors of interest to produce one or more different types of summarized performance data; and
   means for storing the summarized performance data into a database; and
   means for utilizing the stored summarized performance data as a basis for ascertaining quality of service conditions of the data access system.

13. A performance management system that monitors data transferred between at least one remote site and at least one user site, comprising:
   a network browser disposed on a first user site of the at least one user site and configured to browse the at least one remote site, in response to a request by a user of the first site, for transferring data between the at least one remote site and the first user site;
   a client that resides on the first user site of the at least one user site and is configured to collect performance data including performance metrics of a data transfer operation initiated by a network browser request, initiated by a user of the first site, from the network browser, the data transfer operation effecting data transfer between the first user site and the at least one remote site, the performance data being associated with individual web page object retrievals; and
   an agent in communication with the client and residing on the first user site, the agent being adapted to create preliminary summary data of the performance data, wherein the preliminary summary data includes summaries of at least the individual web page object retrievals from the at least one remote site, wherein at least a portion of the preliminary summary data is correlated with one or more factors of interest to produce one or more different types of summarized performance data.

14. A performance management system that monitors data transferred between at least one remote site and at least one user site, comprising:
   a network browser disposed on a first user site of the at least one user site and configured to browse the at least one remote site, in response to a request by a user of the first site, for transferring data between the at least one remote site and the first user site; and
   a client application residing on the first user site of the at least one user site, the client application comprising:
   a data gathering module that is adapted to collect performance data of data transfer operations that effect data transfer between the first user site and the at least one remote site initiated by network browser requests initiated by a user of the first user site, the performance data including at least communication data indicative of network performance statistics for data transfers and application data indicative of application performance statistics of the network browser, the performance data being associated with individual web page object retrievals; and
   an agent that is adapted to create preliminary summary data from at least the performance data for transmission to at least one server from the client application, wherein the preliminary summary data includes summaries of at least the individual web page object retrievals from the at least one remote site, wherein at least a portion of the preliminary summary data is correlated with one or more factors of interest to produce one or more different types of summarized performance data.

15. The performance management system according to claim 14, wherein the client application is adapted to simultaneously integrate with at least a network level interface and an application level interface for measurement and collection of the communication data and the application data.

16. The performance management system according to claim 14, wherein the client application is adapted to combine the collected performance data into a single page performance record.

17. The performance management system according to claim 14, wherein the received performance data is used to determine overall usage of a data access system.

18. The performance management system according to claim 14, wherein the received performance data is used to ascertain a quality of service based on an aggregated end user response to a data access system.

19. The performance management system according to claim 14, wherein the received performance data is used to analyze aggregated end user response based on actions taken within a data access system and wherein the aggregated end user response is used to infer end user behavior.

20. The performance management system according to claim 19, wherein the at least one server is configured to use the received performance data to produce reports of the received data.

21. The performance management system according to claim 14, wherein the client application is adapted to buffer page performance measurements for transmission or internal assessment.

22. The performance management system according to claim 21, wherein the client application is adapted to transmit the buffered page performance measurements in response to instruction from the at least one server or in response to the internal assessment.

23. The performance management system according to claim 14, wherein the client application is adapted to respond to and transmit a configurable number of subsequent page performance measurements based on a set of received rules including a number of pages to transmit or a duration of time to transmit subsequent pages.

24. The performance management system according to claim 14, wherein the client application is adapted to request and cache, for a configurable period of time, metrics associated with objects and load operations that correspond to the individual web page object retrievals from the at least one remote site.

25. The performance management system according to claim 24, wherein the objects comprise graphical and non-graphical web page components.

26. The performance management system according to claim 25, wherein the objects comprise images, plug-ins, page frames, applets and cascading style sheets associated with web pages and web frames.

27. The performance management system according to claim 14, wherein the client application is adapted to transmit predefined performance measurements based on instruction received from the at least one server.

28. The performance management system according to claim 27, wherein the client application transmits the predefined performance measurements based on metrics associated with at least one of objects and load operations that correspond to the individual web page object retrievals.

29. The performance management system according to claim 27, wherein the client application transmits the predefined performance measurements based on instructions received from the at least one server for selected objects that correspond to the individual web page object retrievals.

30. The performance management system according to claim 14, wherein the client application is adapted to perform network operations, including diagnostic tests based on instructions received from the at least one server.

31. The performance management system according to claim 30, wherein the client application performs the network operations triggered by metrics associated with at least one of objects and load operations that correspond to the individual web page object retrievals.

32. The performance management system according to claim 30, wherein the client application performs the network operations triggered by instructions received from the at least one server for selected objects that corresponds to the individual web page object retrievals.

33. The performance management system according to claim 14, wherein the client application is adapted to respond to instructions received from the at least one server for a duration of time.

34. The performance management system according to claim 33, wherein the client application responds to the instructions for the duration of time based on metrics associated with at least one of individual objects and load operations that correspond to the individual web page object retrievals.

35. The performance management system according to claim 33, wherein the client application responds to the instructions for the duration of time based on instructions received from the at least one server for selected objects that correspond to the individual web page object retrievals.

36. The performance management system according to claim 14, wherein the client application is adapted to communicate with an end user via a graphical interface.

37. The performance management system according to claim 36, wherein the client application initiates communication with the end user based on metrics associated with at least one of individual objects and load operations that correspond to the individual web page object retrievals.

38. The performance management system according to claim 36, wherein the client application initiates communication with the end user based on instructions received from the at least one server for selected objects that correspond to the individual web page object retrievals.

39. The performance management system according to claim 14, wherein the client application is adapted to communicate with an end user via a graphical interface based on metrics associated with at least one of individual objects and load operations, wherein the metrics include at least one of an observed set of page performance measurements, wait times, subsequent number of page visits, geography, or domain abandonment.

40. The performance management system according to claim 14, wherein the at least one server is adapted to provide the agent with instructions associated with a selected object, wherein the instructions include at least one of measurement requests, threshold values, user geography, user page identification, user Internet service provider, and user hardware.

41. The performance management system according to claim 14, wherein the at least one server is adapted to reply with instructions associated with selected objects including at least one of measurement requests, threshold values, and an aggregated set of received measurements from a subset of agents of the at least one user site.

42. The performance management system according to claim 14, wherein the client application is adapted to retrieve and alter a current software version residing on the user site based on instructions from the server.

43. The performance management system according to claim 42, wherein the at least one server is adapted to determine and initiate software version alterations based on version information.

44. The performance management system according to claim 14, wherein the at least one server is adapted to collect, aggregate, and display performance data associated with predefined individual objects measured by the agent.

45. The performance management system according to claim 14, wherein the at least one server is adapted to store, display and determine trends based on performance data that is associated with individual objects measured by the agent.

46. The performance management system according to claim 14, wherein the at least one server is adapted to collect and aggregate performance data for comparison to predefined performance based threshold settings.

47. The performance management system according to claim 14, wherein the at least one server is adapted to create, store, and evaluate performance thresholds settings based on at least one of metric values, metric value percentage differences, direct metric comparison with other metrics, historical metric values, and metric value rate of change calculations.

48. The performance management system according to claim 14, wherein the at least one server is adapted to monitor performance threshold settings and, if predetermined values are exceeded, provide automated user indications.

49. The performance management system according to claim 14, wherein the application data are indicative of at least one of browser imposed latency, user experience, user reaction, and user tolerance to data transfer characteristics as measurable from the network browser.

* * * * *